US010236742B2

(12) United States Patent
Smith et al.

(10) Patent No.: US 10,236,742 B2
(45) Date of Patent: Mar. 19, 2019

(54) BRUSHLESS MOTOR FOR A POWER TOOL

(71) Applicant: Black & Decker Inc., New Britain, CT (US)

(72) Inventors: David J. Smith, Columbia, MD (US); David E. Gillespie, Baltimore, MD (US); Merritt J. Tennison, Seattle, WA (US)

(73) Assignee: BLACK & DECKER INC., New Britain, CT (US)

( * ) Notice: Subject to any disclaimer, the term of this patent is extended or adjusted under 35 U.S.C. 154(b) by 575 days.

(21) Appl. No.: 14/951,694

(22) Filed: Nov. 25, 2015

(65) Prior Publication Data
US 2016/0149474 A1    May 26, 2016

Related U.S. Application Data

(60) Provisional application No. 62/084,300, filed on Nov. 25, 2014.

(51) Int. Cl.
*H02K 7/14*    (2006.01)
*H02K 5/15*    (2006.01)
(Continued)

(52) U.S. Cl.
CPC .............. *H02K 5/15* (2013.01); *H02K 1/276* (2013.01); *H02K 1/2766* (2013.01); *H02K 1/28* (2013.01);
(Continued)

(58) Field of Classification Search
CPC ........ H02K 5/15; H02K 11/215; H02K 1/276; H02K 1/2766; H02K 1/28; H02K 5/16; H02K 7/145; H02K 2213/12
(Continued)

(56) References Cited

U.S. PATENT DOCUMENTS

| 872,324 A | 12/1907 | Bergman |
|---|---|---|
| 1,154,496 A | 9/1915 | Emmet |
| (Continued) | | |

FOREIGN PATENT DOCUMENTS

| CN | 102403828 | 4/2012 |
|---|---|---|
| CN | 202435221 | 9/2012 |
| (Continued) | | |

OTHER PUBLICATIONS

Non Final Office Action dated Feb. 7, 2018 issued in corresponding U.S. Appl. No. 14/951,681.
(Continued)

*Primary Examiner* — Jianchun Qin
(74) *Attorney, Agent, or Firm* — Amir Rohani

(57) ABSTRACT

A power tool is provided including a housing; and an electric brushless DC (BLDG) motor housed inside the housing. The motor includes a motor housing having a substantially cylindrical body and a back plate, the cylindrical body of the motor housing defining a slot at or proximate the back plate; a stator housed within the motor housing; a rotor pivotably arranged inside the stator, the rotor including a rotor shaft, a rotor core rotatably mounted on the rotor shaft and housing rotor magnets therein, and a sense magnet ring affixed to the rotor shaft and having magnets aligned with the rotor magnets; and a positional sensor board having positional sensors mounted thereon, the positional sensor board being received through the slot of the motor housing to dispose the positional sensors in close proximity to the sense magnet ring.

17 Claims, 8 Drawing Sheets

(51) Int. Cl.
  *H02K 1/27* (2006.01)
  *H02K 1/28* (2006.01)
  *H02K 5/16* (2006.01)
  *H02K 11/215* (2016.01)

(52) U.S. Cl.
  CPC .............. *H02K 5/16* (2013.01); *H02K 7/145* (2013.01); *H02K 11/215* (2016.01); *H02K 2213/12* (2013.01)

(58) Field of Classification Search
  USPC .......................................................... 310/50
  See application file for complete search history.

(56) References Cited

U.S. PATENT DOCUMENTS

| | | |
|---|---|---|
| 3,031,593 A | 4/1962 | Cametti |
| 3,495,113 A | 2/1970 | Haydon |
| 3,988,654 A | 10/1976 | Takahashi et al. |
| 4,047,136 A | 9/1977 | Satto |
| 4,217,508 A | 8/1980 | Uzuka |
| 4,327,302 A | 4/1982 | Hershberger |
| 4,333,026 A | 6/1982 | Bock et al. |
| 4,341,968 A | 7/1982 | Borden et al. |
| 4,381,465 A | 4/1983 | Renkl et al. |
| 4,412,158 A | 10/1983 | Jefferson et al. |
| 4,469,971 A | 9/1984 | Moore |
| 4,570,333 A | 2/1986 | Jones |
| 4,633,110 A | 12/1986 | Genco et al. |
| 4,701,653 A | 10/1987 | Merkle et al. |
| 4,751,411 A | 6/1988 | Fukaya et al. |
| 4,779,330 A | 10/1988 | Genco et al. |
| 4,845,837 A | 7/1989 | Lloyd et al. |
| 4,858,044 A | 8/1989 | Crapo |
| 4,865,173 A | 9/1989 | Leigh et al. |
| 4,902,941 A | 2/1990 | Merkle et al. |
| 4,936,428 A | 6/1990 | Leigh et al. |
| 4,939,398 A | 7/1990 | Lloyd |
| 4,955,790 A | 9/1990 | Nakanishi et al. |
| 4,981,202 A | 1/1991 | Leigh et al. |
| 4,998,865 A | 3/1991 | Nakanishi et al. |
| 5,043,613 A | 8/1991 | Kurata et al. |
| 5,053,664 A | 10/1991 | Kikuta et al. |
| 5,073,736 A | 12/1991 | Gschwender et al. |
| 5,095,238 A | 3/1992 | Suzuki et al. |
| 5,096,295 A | 3/1992 | Krupa et al. |
| 5,097,166 A | 3/1992 | Mikulic |
| RE34,001 E | 7/1992 | Wrobel |
| 5,191,256 A | 3/1993 | Reiter et al. |
| 5,229,674 A | 7/1993 | Best |
| 5,369,325 A | 11/1994 | Nagate et al. |
| 5,530,307 A | 6/1996 | Horst |
| 5,532,534 A | 7/1996 | Baker et al. |
| 5,565,721 A | 10/1996 | Knappe |
| 5,610,457 A | 3/1997 | Kurita |
| 5,610,458 A | 3/1997 | Baker et al. |
| 5,635,781 A | 6/1997 | Moritan et al. |
| 5,672,926 A | 9/1997 | Brandes et al. |
| 5,742,450 A | 4/1998 | Moser |
| 5,770,902 A | 6/1998 | Batten et al. |
| 5,798,589 A | 8/1998 | Ohi et al. |
| 5,932,942 A | 8/1999 | Patyk et al. |
| 5,939,807 A | 8/1999 | Patyk et al. |
| 6,049,153 A | 4/2000 | Nishiyama et al. |
| 6,065,946 A | 5/2000 | Lathrop |
| 6,116,215 A | 9/2000 | Soleanicov et al. |
| 6,121,700 A | 9/2000 | Yamaguchi et al. |
| 6,177,740 B1 | 1/2001 | Burns |
| 6,181,035 B1 | 1/2001 | Acquaviva |
| 6,198,372 B1 | 3/2001 | Schwarz et al. |
| 6,232,690 B1 | 5/2001 | Schmider |
| 6,297,572 B1 | 10/2001 | Sunaga et al. |
| 6,320,286 B1 | 11/2001 | Ramarathnam |
| 6,333,576 B1 | 12/2001 | Ishikawa et al. |
| 6,356,001 B1 | 3/2002 | Nishiyama et al. |
| 6,414,413 B1 | 7/2002 | Arai et al. |
| 6,441,524 B1 | 8/2002 | Kaneko et al. |
| 6,441,525 B1 | 8/2002 | Koharagi et al. |
| 6,452,383 B1 | 9/2002 | Goedecke |
| 6,462,450 B1 | 10/2002 | Haussecker et al. |
| 6,525,442 B2 | 2/2003 | Koharagi et al. |
| 6,570,284 B1 | 5/2003 | Agnes et al. |
| 6,577,030 B2 | 6/2003 | Tominaga et al. |
| 6,700,288 B2 | 3/2004 | Smith |
| 6,703,748 B2 | 3/2004 | Arai et al. |
| 6,712,585 B2 | 3/2004 | Iehl et al. |
| 6,727,627 B1 | 4/2004 | Sasaki et al. |
| 6,750,584 B2 | 6/2004 | Smith |
| 6,759,778 B2 | 7/2004 | Nishiyama et al. |
| 6,774,523 B2 | 8/2004 | Ahn et al. |
| 6,822,775 B2 | 11/2004 | Suzuki et al. |
| 6,836,039 B2 | 12/2004 | Choi et al. |
| 6,844,653 B2 | 1/2005 | Kolomeitsev |
| 6,873,081 B2 | 3/2005 | Arai et al. |
| 6,891,298 B2 | 5/2005 | Gary |
| 6,891,299 B2 | 5/2005 | Coupart et al. |
| 6,917,133 B2 | 7/2005 | Koharagi et al. |
| 6,927,519 B2 | 8/2005 | Popov et al. |
| 6,936,946 B2 | 8/2005 | Maeda et al. |
| 6,946,766 B2 | 9/2005 | Gary et al. |
| 6,967,047 B2 | 11/2005 | Heinrich |
| 6,987,342 B2 | 1/2006 | Hans |
| 7,012,346 B2 | 3/2006 | Hoffman et al. |
| 7,028,545 B2 | 4/2006 | Gandel et al. |
| 7,057,317 B2 | 6/2006 | Kuwert |
| 7,057,318 B2 | 6/2006 | Strobl et al. |
| 7,057,323 B2 | 6/2006 | Horst |
| 7,064,462 B2 | 6/2006 | Hempe et al. |
| 7,105,978 B2 | 9/2006 | Maeda et al. |
| 7,159,842 B1 | 1/2007 | Taylor et al. |
| 7,183,686 B2 | 2/2007 | Sasaki et al. |
| 7,215,052 B2 | 5/2007 | Blase et al. |
| 7,315,102 B2 | 1/2008 | Minagawa |
| 7,385,328 B2 | 6/2008 | Melfi |
| 7,394,174 B2 | 7/2008 | Blase et al. |
| 7,411,387 B2 | 8/2008 | Yamada |
| 7,567,001 B2 | 7/2009 | Kasai et al. |
| 7,592,725 B2 | 9/2009 | Utsumi |
| 7,605,510 B2 | 10/2009 | Okuma et al. |
| 7,626,303 B2 | 12/2009 | Watanabe et al. |
| 7,705,502 B2 | 4/2010 | Hoemann et al. |
| 7,732,963 B2 | 6/2010 | Iizuka et al. |
| 7,732,965 B2 | 6/2010 | Nakayama et al. |
| 7,768,172 B2 | 8/2010 | Takahata et al. |
| 7,770,660 B2 | 8/2010 | Schroeder et al. |
| 7,791,232 B2 | 9/2010 | Purohit et al. |
| 7,800,272 B2 | 9/2010 | Nakayama et al. |
| 7,804,213 B2 | 9/2010 | Hoffman et al. |
| 7,821,217 B2 | 10/2010 | Abolhassani et al. |
| 7,843,101 B2 | 11/2010 | Ito et al. |
| 7,847,456 B2 | 12/2010 | Kori et al. |
| 7,868,503 B1 | 1/2011 | Nakayama et al. |
| 7,906,882 B2 | 3/2011 | Okuma et al. |
| 7,915,776 B2 | 3/2011 | Takahata et al. |
| 7,923,881 B2 | 4/2011 | Ionel et al. |
| 7,932,658 B2 | 4/2011 | Ionel |
| 7,948,138 B2 | 5/2011 | Hattori et al. |
| 7,952,249 B2 | 5/2011 | Kori et al. |
| 7,994,666 B2 | 8/2011 | Kori et al. |
| 8,026,648 B2 | 9/2011 | Abel et al. |
| 8,063,524 B2 | 11/2011 | Shin et al. |
| 8,080,908 B2 | 12/2011 | Matsubara et al. |
| 8,129,872 B2 | 3/2012 | Hoffman et al. |
| 8,143,752 B2 | 3/2012 | Altindis |
| 8,188,624 B2 | 5/2012 | Noh et al. |
| 8,222,792 B2 | 7/2012 | Platon et al. |
| 8,232,703 B2 | 7/2012 | Nakayama et al. |
| 8,323,143 B2 | 12/2012 | Schoon |
| 8,339,004 B2 | 12/2012 | Tang et al. |
| 8,350,435 B2 | 1/2013 | Hoemann et al. |
| 8,362,668 B2 | 1/2013 | Takahashi et al. |
| 8,373,323 B2 | 2/2013 | Tang et al. |
| RE44,037 E | 3/2013 | Tajima et al. |
| 8,421,288 B2 | 4/2013 | Tang et al. |

(56) References Cited

U.S. PATENT DOCUMENTS

| | | |
|---|---|---|
| 8,436,497 B2 | 5/2013 | Horng et al. |
| 8,536,748 B2 | 9/2013 | Liang et al. |
| 8,545,193 B2 | 10/2013 | Kim et al. |
| 8,575,817 B2 | 11/2013 | Platon et al. |
| 8,587,167 B2 | 11/2013 | Kado et al. |
| 8,587,173 B2 | 11/2013 | Kurosawa et al. |
| 8,674,569 B2 | 3/2014 | Jang et al. |
| 9,048,709 B2 | 6/2015 | Chang |
| 9,318,932 B2 * | 4/2016 | Purohit .................. H02K 9/06 |
| 2003/0052567 A1 | 3/2003 | Yonekura |
| 2004/0217666 A1 | 11/2004 | Mellor et al. |
| 2007/0040463 A1 | 2/2007 | Zorweg et al. |
| 2008/0073986 A1 | 3/2008 | Lee |
| 2010/0252295 A1 | 10/2010 | Schroeder et al. |
| 2011/0018380 A1 | 1/2011 | Yoshida et al. |
| 2011/0241499 A1 | 10/2011 | Nakamura et al. |
| 2012/0007456 A1 | 1/2012 | Hein et al. |
| 2012/0032539 A1 | 2/2012 | Hori et al. |
| 2012/0306295 A1 | 12/2012 | Kirstein |
| 2013/0002058 A1 | 1/2013 | McIntosh |
| 2013/0057095 A1 | 3/2013 | Okinaga et al. |
| 2013/0057105 A1 | 3/2013 | Patterson et al. |
| 2013/0057107 A1 | 3/2013 | Stretz et al. |
| 2013/0091902 A1 | 4/2013 | Hill et al. |
| 2013/0099609 A1 | 4/2013 | Ikeno et al. |
| 2013/0172903 A1 | 7/2013 | Suarez et al. |
| 2013/0187517 A1 | 7/2013 | Asao et al. |
| 2013/0193801 A1 | 8/2013 | Schmid et al. |
| 2013/0207491 A1 | 8/2013 | Hatfield et al. |
| 2013/0270932 A1 | 10/2013 | Hatfield et al. |
| 2013/0270934 A1 | 10/2013 | Smith et al. |
| 2013/0278106 A1 | 10/2013 | Kim et al. |
| 2013/0300250 A1 | 11/2013 | McKinzie et al. |
| 2013/0313925 A1 | 11/2013 | Mergener et al. |
| 2013/0342041 A1 | 12/2013 | Ayers et al. |
| 2014/0015350 A1 | 1/2014 | Yoshida et al. |
| 2014/0067056 A1 | 3/2014 | Schimpf et al. |
| 2014/0103769 A1 | 4/2014 | Kingrey et al. |
| 2014/0103772 A1 | 4/2014 | Kingrey et al. |
| 2014/0111050 A1 | 4/2014 | Chamberlin |
| 2014/0125158 A1 | 5/2014 | Hessenberger et al. |
| 2014/0132093 A1 | 5/2014 | Purohit et al. |
| 2014/0132094 A1 | 5/2014 | Chamberlin et al. |
| 2014/0346921 A1 | 11/2014 | Muschelknautz et al. |
| 2014/0361645 A1 | 12/2014 | Beyerl |
| 2015/0028716 A1 | 1/2015 | Zook et al. |
| 2015/0042214 A1 | 2/2015 | Osborne et al. |
| 2015/0061452 A1 | 3/2015 | Nakatake et al. |
| 2015/0069864 A1 | 3/2015 | Nagahama et al. |
| 2015/0076933 A1 | 3/2015 | Hoemann et al. |
| 2015/0076954 A1 | 3/2015 | Johnson et al. |
| 2015/0123501 A1 | 5/2015 | Jang et al. |
| 2015/0155765 A1 | 6/2015 | Zenowich et al. |
| 2015/0171709 A1 | 6/2015 | Ito et al. |
| 2015/0180290 A1 | 6/2015 | Yin et al. |
| 2015/0180307 A1 | 6/2015 | Inuzuka |
| 2015/0194859 A1 | 7/2015 | Osborne et al. |

FOREIGN PATENT DOCUMENTS

| | | |
|---|---|---|
| JP | 54043514 A | 4/1979 |
| JP | 57142167 A | 9/1982 |
| JP | 61035501 A | 2/1986 |
| JP | 02197246 A | 8/1990 |
| JP | 05304742 A | 11/1993 |
| JP | 09023629 A | 1/1997 |
| JP | 2005318687 A | 11/2005 |
| JP | 2006115687 A | 4/2006 |
| JP | 2007006592 A | 1/2007 |
| JP | 2008219997 A | 9/2008 |
| JP | 2011226352 A | 11/2011 |
| JP | 2013135547 A | 7/2013 |
| JP | 2013207824 A | 10/2013 |
| WO | 2009011462 A | 1/2009 |
| WO | 2012045525 | 4/2012 |
| WO | 2013097981 | 7/2013 |

OTHER PUBLICATIONS

EP Office Action dated Feb. 12, 2018 issued in corresponding EP Application No. 15196321.2.
European Search Report dated Apr. 5, 2016.
Extended EP Search Report dated Jun. 28, 2017 issued in corresponding EP application 17159996.2.

\* cited by examiner

BRUSHLESS MOTOR FOR A POWER TOOL

RELATED APPLICATION

This disclosure claims the benefit of U.S. Provisional Application No. 62/084,300 filed Nov. 25, 2014, which is incorporated herein by reference in its entirety.

FIELD OF THE DISCLOSURE

This disclosure relates to power tools. More particularly, the present invention relates to a power tool and a brushless motor for power tools.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. While BLDC motors provide many size and power output advantages over universal and permanent magnet DC motors, it is always desired to manufacture more compact motors while providing the same or higher power output.

SUMMARY

According to an embodiment of the invention, a power tool is provided including a housing; and an electric brushless DC (BLDG) motor housed inside the housing. In an embodiment, the motor includes a motor housing having a substantially cylindrical body and a back plate, the cylindrical body of the motor housing defining a slot at or proximate the back plate; a stator housed within the motor housing; a rotor pivotably arranged inside the stator, the rotor comprising a rotor shaft, a rotor core rotatably mounted on the rotor shaft and housing a plurality of rotor magnets therein, and a sense magnet ring affixed to the rotor shaft and having a plurality of magnets aligned with the rotor magnets; and a positional sensor board having a plurality of positional sensors mounted thereon, the positional sensor board being received through the slot of the motor housing to dispose the positional sensors in close proximity to the sense magnet ring.

In an embodiment, the motor housing further comprises at least one retention feature configured to securely hold the positional sense board within the motor housing proximate the sense magnet ring.

In an embodiment, the positional sensors comprise a plurality of Hall sensors mounted on a first surface thereof facing the sense magnet, a second surface of the positional sensor board being in contact with an inner surface of the back plate of the motor housing.

In an embodiment, the positional sensor board partially protrudes outside the slot of the motor housing and comprises a plurality of hall terminals accessible outside the motor housing.

In an embodiment, the motor further includes a plurality of motor terminals arranged on the stator and accessible through an opening of the motor housing in substantial proximity to the hall terminals.

In an embodiment, the power tool further includes a control unit having a controller and a plurality of power switches controllable via the controller, the control unit being coupled to the motor terminals and the hall terminals via a plurality of wires.

In an embodiment, the motor housing further includes a bearing pocket arranged on an inner surface of the back plate, and a lower edge of the positional sensor board includes a curved profile to fit radially around the bearing pocket.

In an embodiment, the motor housing further includes a through-hole through the bearing pocket for receiving the rotor shaft, further comprising a fan rotationally affixed to the rotor shaft outside the motor housing.

In an embodiment, the motor housing further includes a plurality of air vents on the back plate to provide fluid communication between the stator and the fan.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
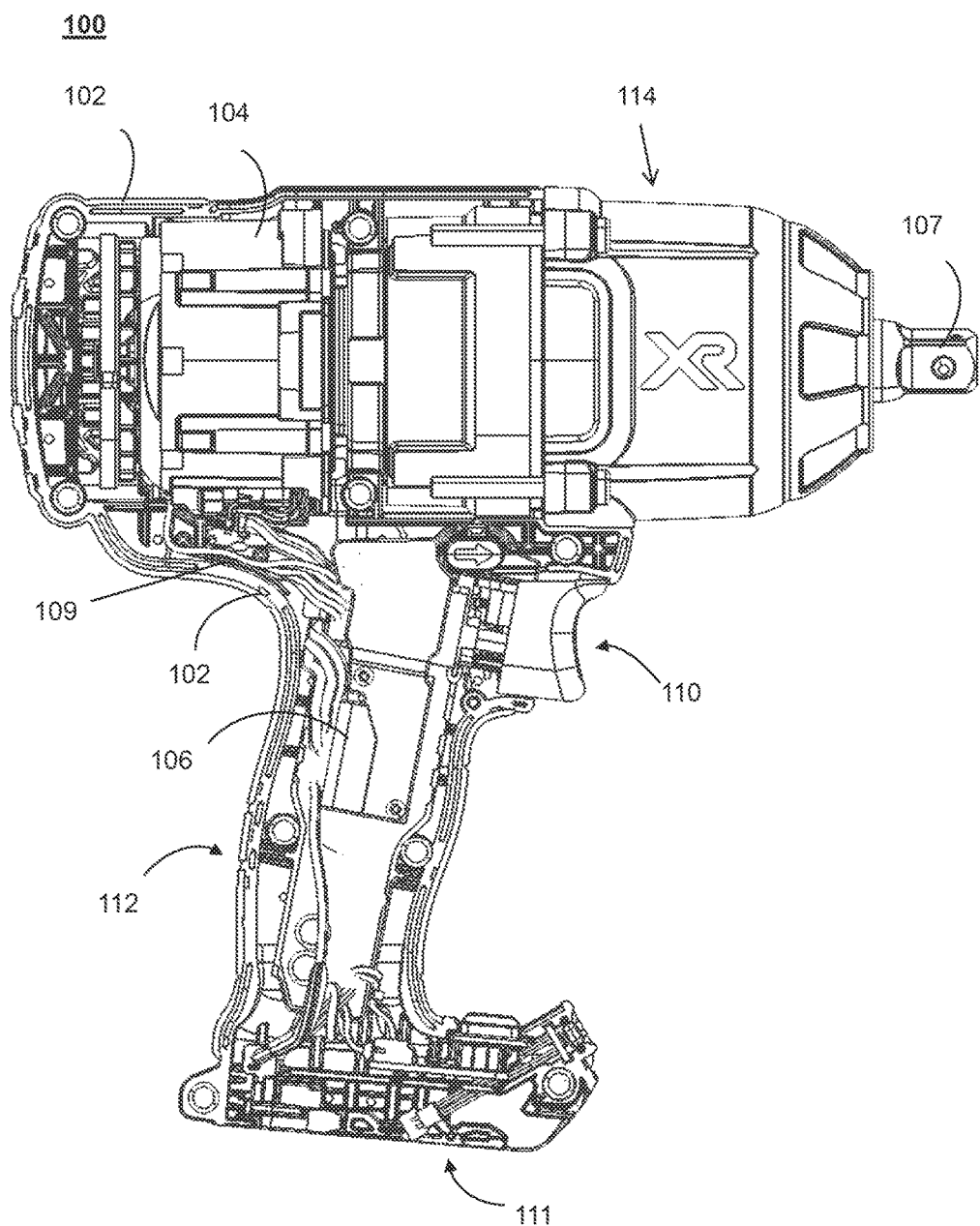
FIG. 1 depicts a side view of an exemplary power tool, in this case an impact wrench, with the tool housing partially removed, according to an embodiment.

With reference to the FIG. 1, a power tool 100 constructed in accordance with the teachings of the present disclosure is illustrated in a longitudinal cross-section view. The power tool 100 in the particular example provided may be an impact wrench, but it will be appreciated that the teachings of this disclosure is merely exemplary and the power tool of this invention could be a drill, impact driver, hammer, grinder, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102 that houses a motor assembly 104 and a control module 106, an input unit (e.g., a variable speed trigger) 110, and a transmission assembly 114 having a gear case (not shown). The motor assembly 104 may be coupled through the gear case to an output spindle (not shown), which is rotatably coupled to a square wrench 107. The tool housing 102 additionally includes handle 112 that, in an embodiment, houses the control module 106.

According to an embodiment, motor 104 is disposed in housing 102 above the handle 112. Motor 104 may be powered by an appropriate power source (electricity, pneumatic power, hydraulic power). In embodiments of the invention, the motor is a brushless DC electric motor and is powered by a battery pack (not shown) through a battery receptacle 111, though it must be understood that power tool 100 may alternatively include a power cord to receive AC power from, for example, a generator or the AC grid, and may include the appropriate circuitry (e.g., a full-wave or half-wave bridge rectifier) to provide positive current to the motor 104.

In an embodiment, input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit coupled and partially mounted within control unit 106 and provide respective inputs of these functions to the control unit 106. Control unit 106, which receives variable-speed, on/off, and/or forward/reverse signal from the input unit 110, supplies the drive signals to the motor 104. In the exemplary embodiment of the invention, the control unit 106 is provided in the handle 112. It must be understood that while input unit 100 is a variable-speed unit, embodiments of the invention disclosed herein similarly apply to fixed-speed power tools (i.e., tools without a speed dial or speed trigger, having constant speed at no load).

In an embodiment, brushless motor 104 depicted in FIG. 1 is commutated electronically by control unit 106. Control unit 106 may include, for example, a programmable microcontroller, micro-process, digital signal processor, or other programmable module configured to control supply of DC power to the motor 104 and accordingly commutate of the motor 104. Alternatively, control unit 106 may include an application-specific integrated circuit (ASIC) configured to execute commutation of the motor 104. Using the variable-speed input, forward/reverse input, on/off input, etc., from the input unit 110, control unit 106 controls the amount of power supplied to the motor 104. In an exemplary embodiment, control unit 106 controls the pulse width modulation (PWM) duty cycle of the DC power supplied to the motor 104. For example, control unit 106 may include (or be coupled to) a series of power switches (e.g., FETs or IGBTs) disposed in a three-phase inverter circuit between the power source and the motor 104. Control unit 106 may control a switching operation of the switches to regulate a supply of power to the motor 104, via motor wires 109.

Commutation details of the brushless motor 104 or the control unit 106 are beyond the scope of this disclosure, and can be found in co-pending International Patent Publication No. WO 3081/159674 by the same assignee as this application, which is incorporated herein by reference in its entirety. An example of an integrated switch and control module embodying an input unit 110 and a control unit 106 described herein may be found in application Ser. No. 14/672,617 filed Mar. 30, 3085 by the same assignee as this application, also incorporated herein by reference in its entirety.

Figure 2A:
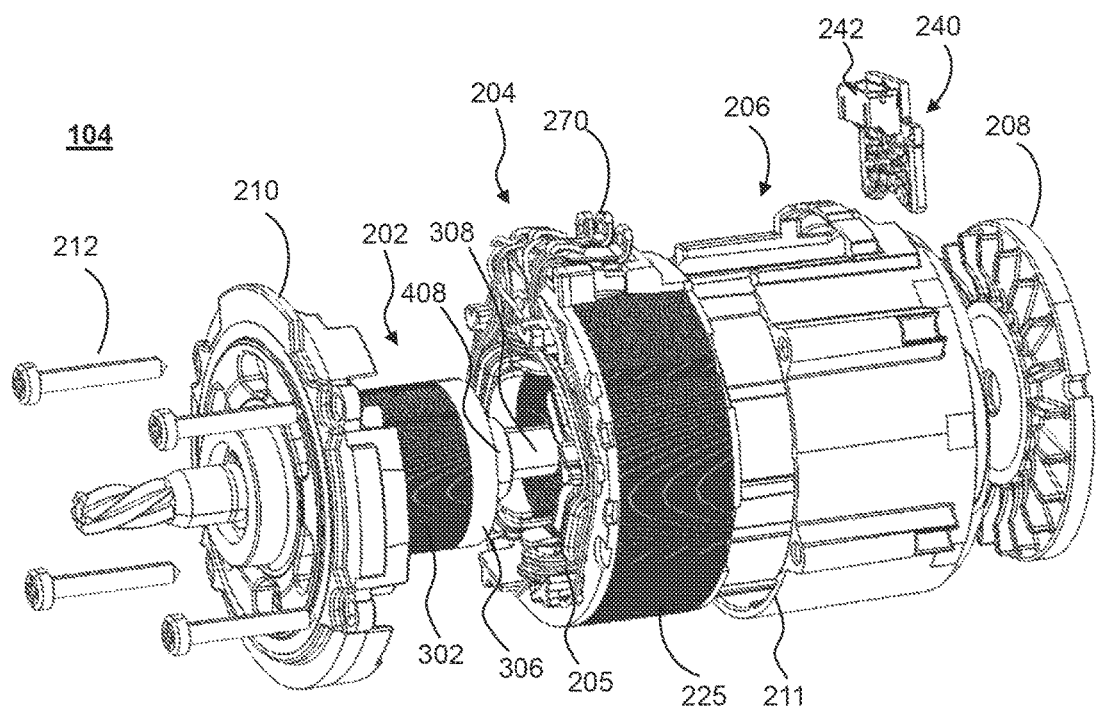
FIGS. 2A and 2B depict perspective front and rear exploded views of a brushless DC (BLDG) motor, according to an embodiment.
Figure 2B:
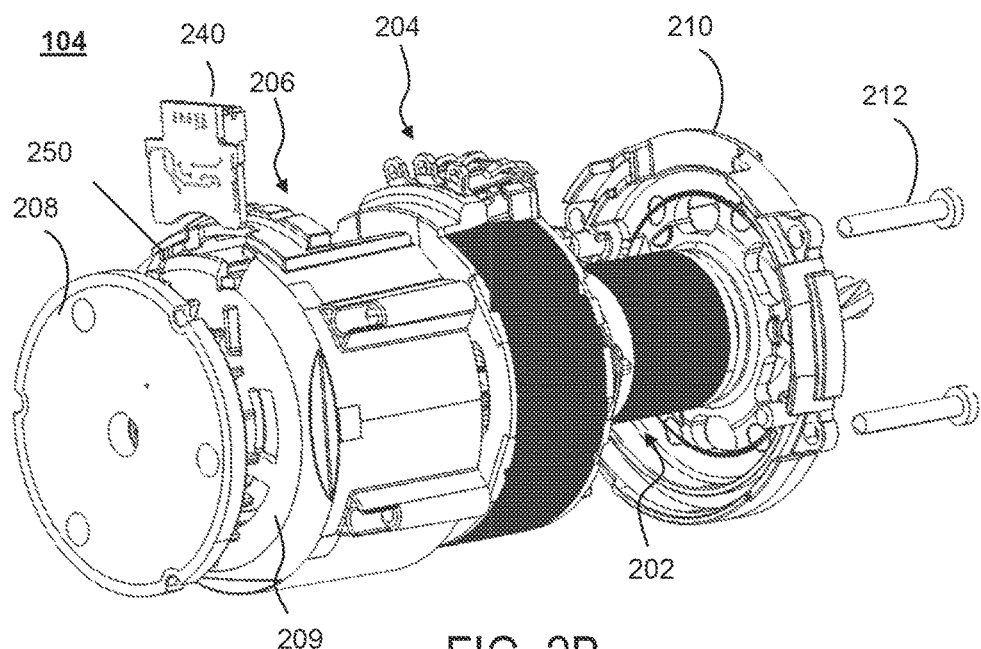

FIGS. 2A and 2B depict front and back perspective exploded views of a brushless DC (BLDG) motor 104, according to an embodiment of the invention. In this embodiment, the motor 104 includes a rotor 202 and a stator 204. Rotor 202, in an embodiment, includes a rotor shaft 308 and a lamination stack 302 housing several permanent magnets (not shown). Stator 204 is disposed around the rotor lamination stack 302 and includes windings 205 wound around teeth of a stator lamination stack 225 that are electrically connected to control unit 106 via terminals 270 and motor wires 109. Control unit 106 electrically commutates the stator windings 205 to drive the motor 104. A positional sensor board 240, including a series of positional sensors (e.g., hall sensors), is provided adjacent a sense magnet 306 of the rotor 202 to sense a rotational position of the rotor 202. Hall sensor board 240 provides the positional information to the control unit 106 via signal wires (not shown) connected to a hall terminal 242. Motor 104 further includes a motor housing 206 (also referred to as motor casing or motor can) that circumferentially encloses the stator 204. Motor housing 206 includes a circumferential opening to expose motor terminals 270. The motor housing 206 also includes, in an embodiment, a back plate portion 209 that encloses an axial end of the stator 204 and rotor 202, separating the stator 204 from a fan 208 that is secured to the motor shaft 308. Back plate portion 209 acts as a baffle to properly direct the air flow generated by the fan 208 through the motor 104. In an embodiment, motor 104 further includes an end cap 210 secured to an end 211 of the motor housing 206 opposite the back plate portion 209 via fastening means (e.g., screws) 212.

An aspect of the invention is disclosed herein with continued reference to FIGS. 2A and 2B, and additionally with reference to FIGS. 3A-4B.

The brushless motor 104 of the invention rely on positional sensors (also referred to as hall-sensors) and/or other electronics to commutate the rotor 202. Thus, proper mechanical alignment (axial/diametric) between motor components is important. The so-called "stack-up error" is typically an inherent part of any mechanical assembly as a result of mechanical components deviating from their "nominal" dimensions. In motor assemblies, these stack-up errors lead to higher motor tolerance levels, which in the axial direction leads to increased overall motor length. In particular, since stator 204 is axially secured to both the motor housing 206 and the end cap 210, the stack-up error resulting from tolerances in all three components should therefore be taken into account in determining the stack-up error, which results in increased motor length.

Figure 3A:
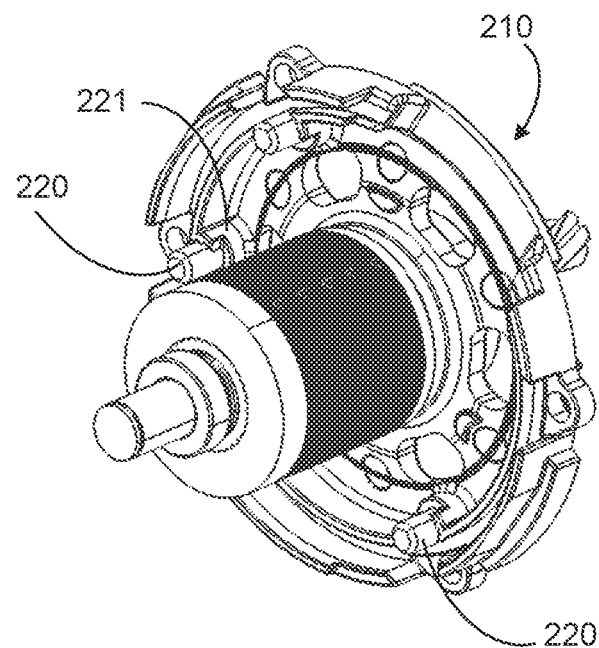
FIG. 3A depicts a perspective view of a motor cap, according to an embodiment.
Figure 3B:
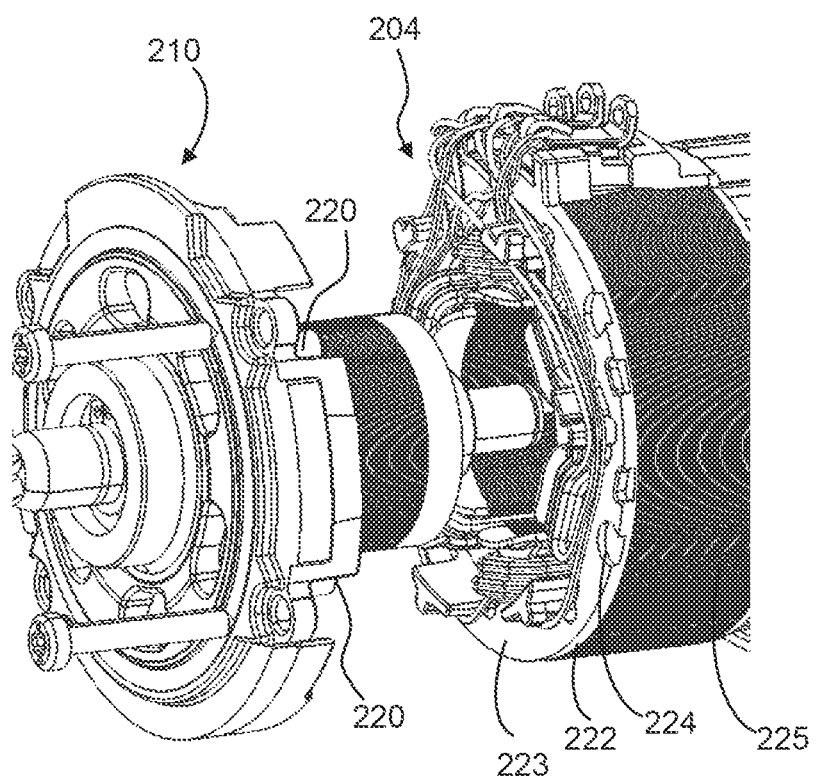
FIG. 3B depicts a partially-exploded perspective view of the motor, according to an embodiment.

FIG. 3A depicts a perspective view of the motor cap 210, according to an embodiment. FIG. 3B depicts a partially-exploded view of the motor 104, according to an embodiment. According to an embodiment of the invention, as shown in FIGS. 3A and 3B, in order to reduce the tolerances associated with the stator 204, end cap 210 is provided with a plurality of flexible posts 220 on a surface thereof facing the stator 204 arranged to rest on an axial surface 223 of the stator 204. In an embodiment, flexible posts 220 are received, for example, via press fitting, within cylindrical pockets 221 on the surface 223 of the end cap 210 facing the stator 204. In an embodiment, axial surface 223 may be provided on an end insulator 222 attached to an end of the stator lamination stack 225. In an embodiment, end insulator 222 of the stator 204 includes post pockets 224 recessed in its axial surface 223 that correspond to and receive the flexible posts 220. The flexible posts 220 are made of elastic material such as flexible plastic or rubber.

In an embodiment, end cap 210 may be secured to the stator 204. Alternatively, end cap 210 may be secured to the motor housing 206, e.g. via fasteners 212 shown in FIGS. 2A and 2B. In yet another embodiment, end cap 210 may engage a retention feature within the power tool 100 housing 102, which aligns and retains the end cap 210 properly with respect to the stator 204 and stator housing 206. In all these embodiments, when the end cap 210 is secured in place, the flexible posts 220 rest on a surface of the stator 204 within the post detents 224. Alternatively flexible posts 220 rest directly on the end insulator 222 of the stator 204. Flexible posts 220 provide a spring-like interface with the stator 204, absorbing any mechanical stack-up errors or tolerances associated with the stator 204 and the end cap 210. In this matter, the stator 204 is axially secured to the end cap 210 without adding additional axial tolerances to the overall length of the motor 104.

Figure 4A:
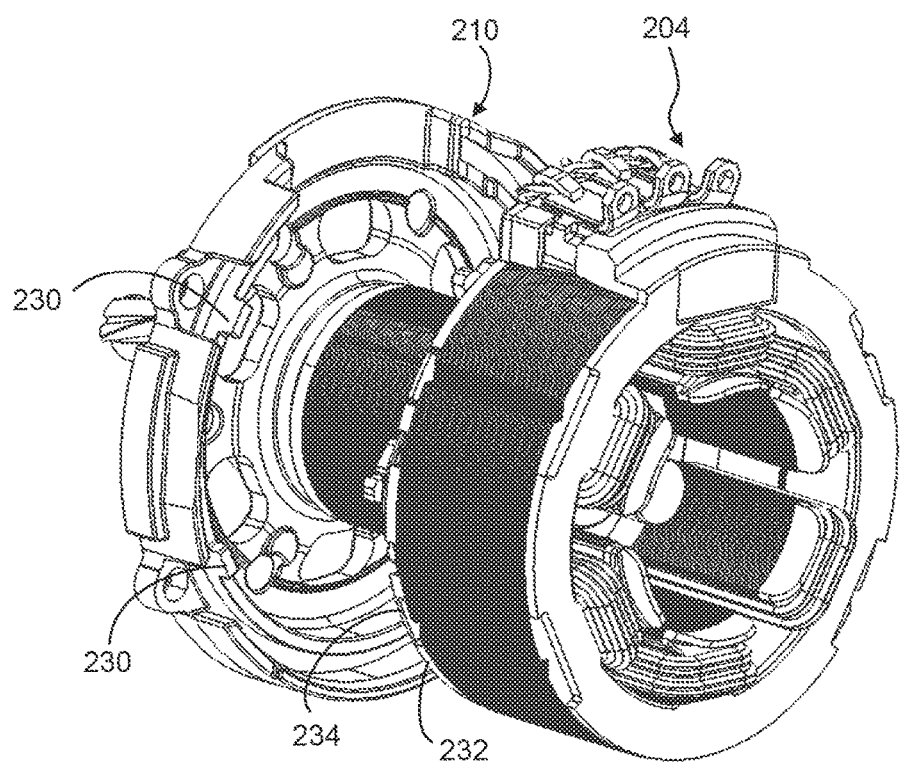
FIG. 4A depicts partially-exploded perspective view of the motor, according to an alternative embodiment.
Figure 4B:
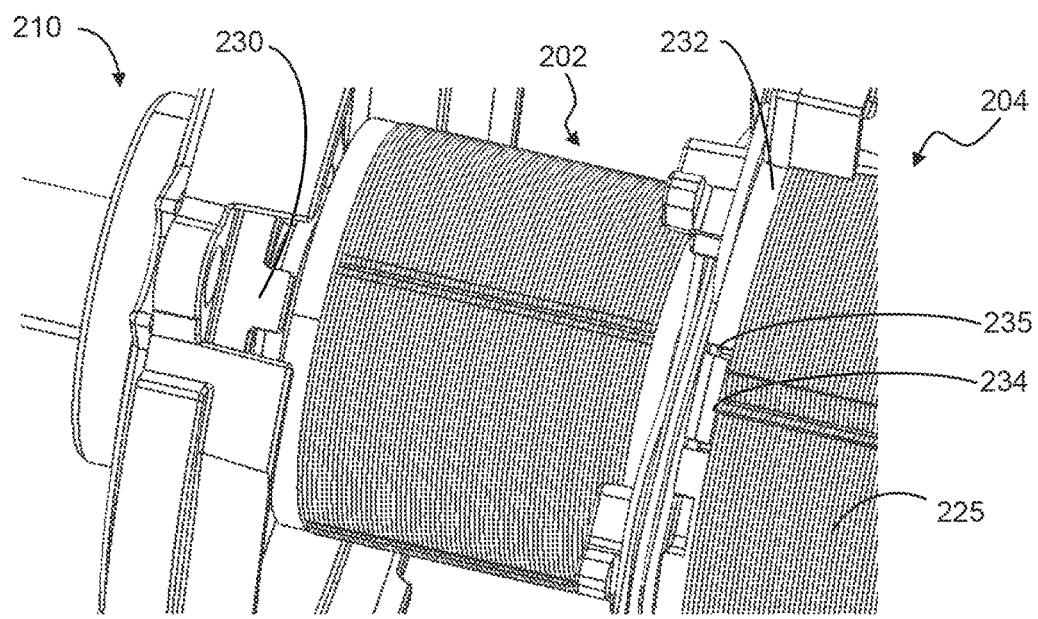
FIG. 4B depicts a zoomed-in view of the motor of FIG. 4A, according to an embodiment.

FIGS. 4A and 4B depict an alternative embodiment of the invention. In this embodiment, stack-up errors are absorbed via an elastic member provided on the end insulator 232 of the stator 204. In an embodiment, the motor cap 210 includes axial tabs or posts 230. The end insulator 232 of the stator 204 includes radial deflect portions 234. Radial deflect portions 234 are arranged in peripheral radial recessed portions 235 of the end insulator 232 and extend radially outwardly from within the recessed portions 235. The width of the radial deflect portions 234 is typically smaller than the rest of the end insulator 232, thus providing a small gap in the axial direction between the stator lamination stack 225 and the deflect portions 234. Deflect portions 234 extend from the recessed portions 235 of the end insulator 232 on one side only, and outer edges of the deflect portions 234 are not in contact with the outer periphery of the end insulator 232. This creates a biasing force within the deflect portions 234, allowing them to act as springs when engaged by posts 230 of the end cap 210. When posts 230 push against the deflect portions 234 during the assembly process, deflect portions 234 provide flexibility in the axial direction of the motor 104 between the stator 204 and the end cap 210. This embodiment is different from the previous embodiment in that the spring-action is provided on the stator side rather than on the end cap.

Another aspect of the invention is discussed herein with reference to FIGS. 5-9.

Figure 5:
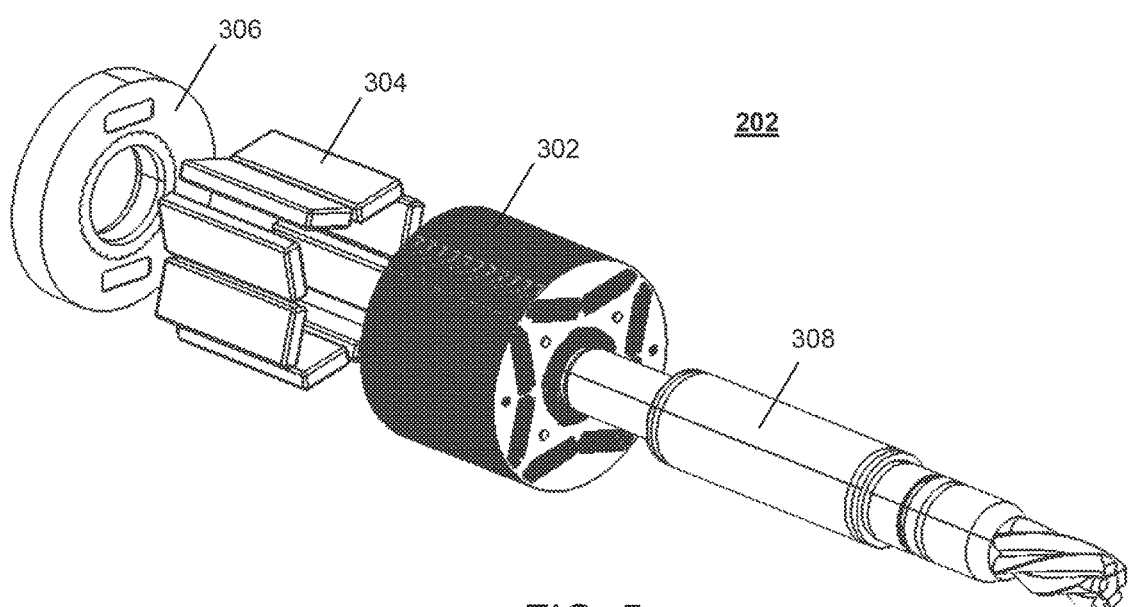
FIG. 5 depicts a perspective exploded view of a rotor assembly, according to an embodiment.

FIG. 5 depicts an exemplary rotor assembly 202 including a rotor lamination stack 302, rotor permanent magnets 304, sense magnet ring 306, and rotor shaft 308. In an embodiment, the magnets 304 are embedded within the rotor lamination stack 302. Specifically, in an embodiment, two magnets are provided at an obtuse angle with respect to one another at each pole of the rotor lamination stack 302, for a total of either magnets. It is noted that this arrangement and number of magnets is exemplary and the magnets may be positioned in different arrangements within each pole.

Figures 6, 7:
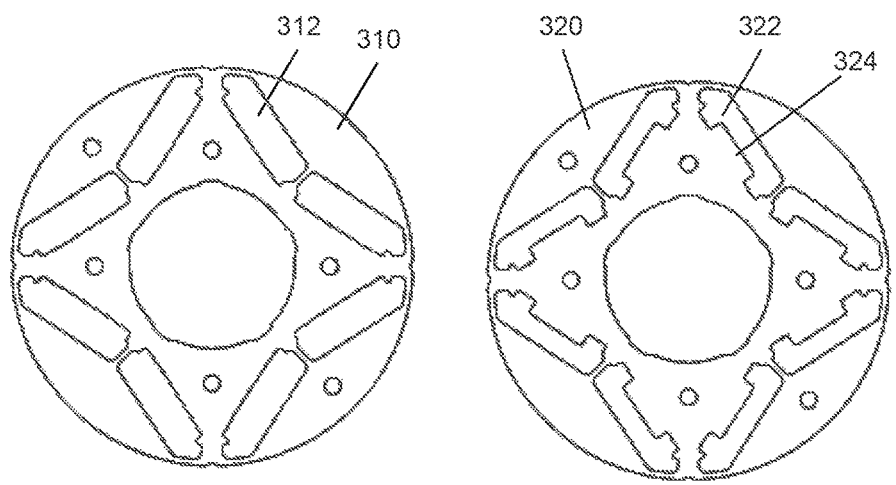
FIG. 6 depicts an axial view of a rotor lamination, according to an embodiment.
FIG. 7 depicts an axial view of a rotor end lamination, according to an embodiment.

FIG. 6 depicts a single lamination 310 provided within the lamination stack 302, according to an embodiment. Lamination 310 herein includes a plurality of slots 312 arranged to receive the magnets 304. Slots 312 are arranged to securely contain at least two elongated sides of the magnets 304.

In conventional motor designs, in order to ensure that the magnets don't move axially within the lamination stack slots, two rotor end caps are provided to axially block the magnets from moving. The end caps may be, for example, a plastic disc-shaped component having the same diameter as the lamination stack without the slots, and affixed to the ends of the lamination stack. The end caps contain the magnet within the lamination slots. However, this arrangement increases the overall length of the motor and requires added costs for manufacturing and assembly of the end caps.

According to an embodiment of the invention, in order to reduce the overall length and costs of the motor, an improved rotor assembly is provided in which the end lamination (or laminations) have a different profile that the rest of the laminations. Specifically, the end lamination (or end laminations) has a profile that include an axial retention feature to block the magnets 304 within the slots 312 of the lamination stack 302. In an embodiment, as shown in FIG. 7, end lamination 320 substantially has the same shape and profile as the remaining laminations 310, but additionally includes projections 324 that project partially into the slots 322. In an embodiment, projections 324 may be substantially rectangular-shaped and extend from one of the long edges of the slots 322. It is noted, however, that each projection 324 may be semi-circular, triangular, or any other suitable shape. In an embodiment, the width of each projection 324 is less than 50% of the width of the slots 322, preferably 10% to 40% the width of the slots 322. In this manner, the projection 324, which is electrically conductive, does not create a flux short between the north and south poles of the magnets 304. When the lamination stack 302 is fully assembled and the magnets are inserted into the slots 312, the projections 324 engage and block axial ends of the magnets 304.

It is noted that in this embodiment of the invention, two different sets of laminations are laminated during the manufacturing process: a large number of laminations 310 without projection 324 and some end laminations 320 with the projections 324. The projections 324 are thus integral parts of the end laminations 320.

Figure 8:
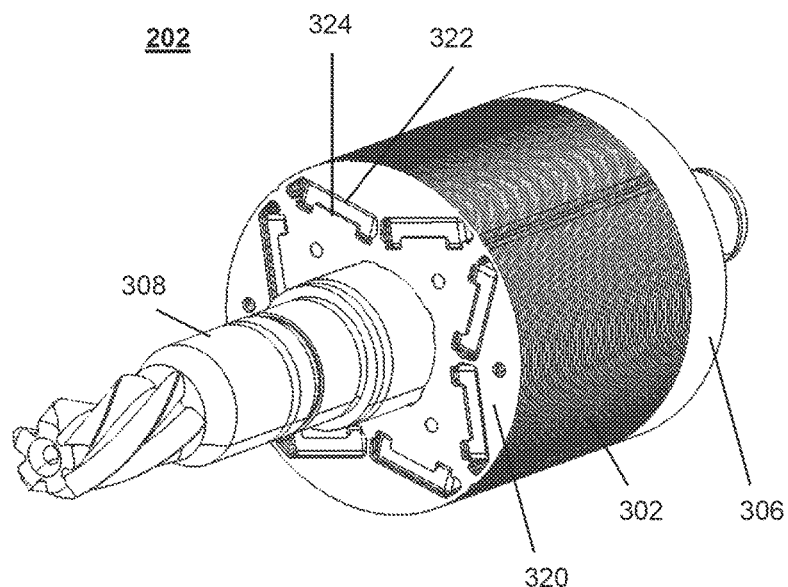
FIG. 8 depicts a perspective view of the rotor assembly, according to an embodiment.

FIG. 8 depicts an exemplary rotor assembly 202 with lamination stack 302 having an end lamination 320 with the projections 324 within the slots 322. In this embodiment, the end lamination 320 is provided at one end of the lamination stack 302 only. The other end of the lamination stack is axially contained by sense magnet ring 306, which is a disc-shaped planar ring including a through-hole and sense magnets aligned with rotor magnets 304 within the lamination stack. In this embodiment, sense magnet ring 306 axially retains the other end of the lamination stack, thus further decreasing the length of the motor.

In an embodiment, during the assembly process, the magnets 304 are inserted through an open end of the slots 322, opposite the end lamination 320. The sense magnet ring 306 is then mounted on the rotor shaft 308 at the end of the lamination stack 302 via, for example, press-fitting, heat-staking, etc.

Figure 9:
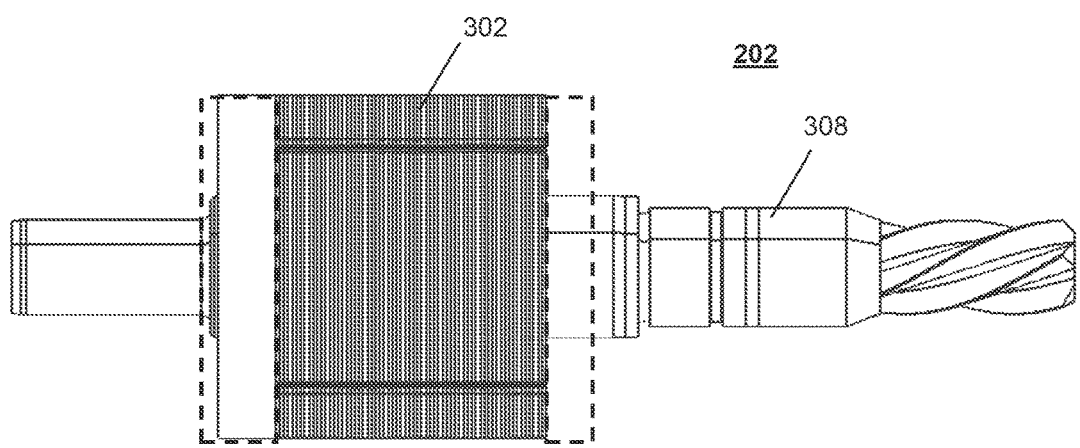
FIG. 9 depicts a side view of the rotor assembly, according to an embodiment.

FIG. 9 depicts a cross-sectional view of the rotor assembly 402, according to an embodiment. The dotted lines indicate the amount of space and components used up by conventional end caps to axially retain the magnets.

Figure 10:
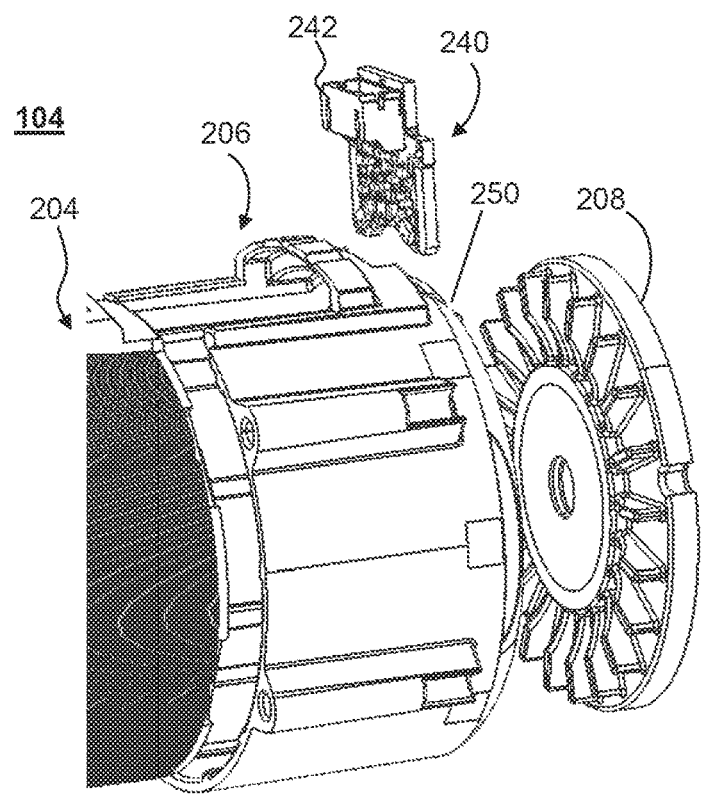
FIG. 10 depicts a partial perspective exploded view of the motor showing a hall sensor board, according to an embodiment.
Figure 11:
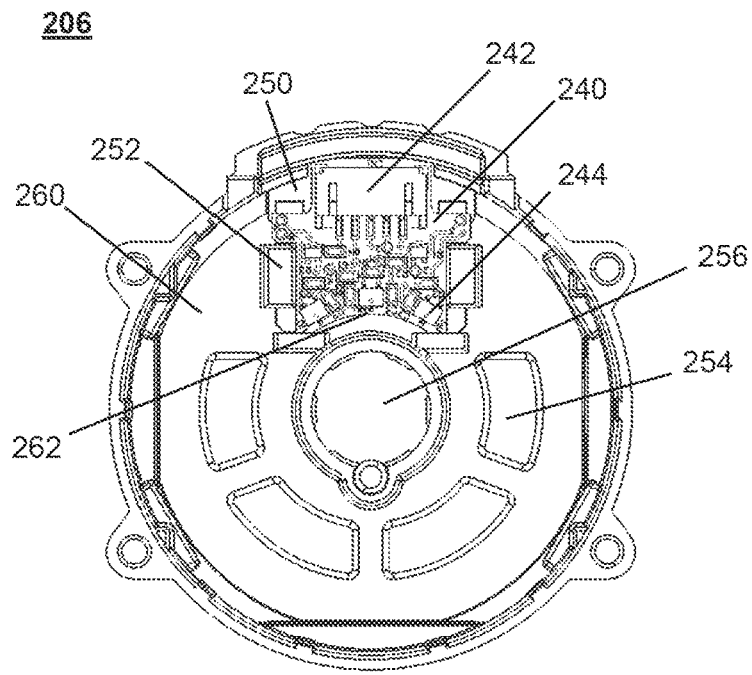
FIG. 11 depicts an axial view of the motor housing, according to an embodiment.
Figure 12:
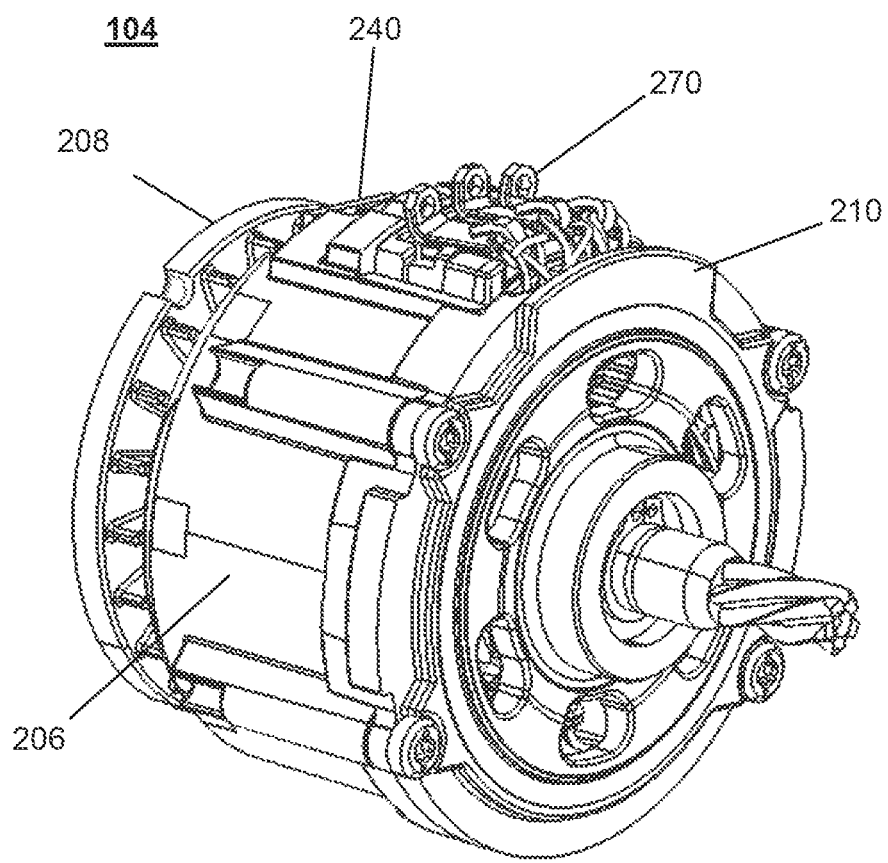
FIG. 12 depicts a perspective view of an assembled motor, according to an embodiment.

Another aspect of the invention is discussed herein with reference to FIGS. 10-12, and with continued reference to FIGS. 2A and 2B.

Use of hall boards (on which hall sensors are mounted) for sensing the rotational position of the rotor is well known. What often poses a problem is where to place the hall board to avoid an unwanted increase in the overall length of the motor. Also, since the hall board has to be wired to the control board that drives the motor, it should be positioned at a location that is easy to access via wires. Placement of the hall board is therefore important for a compact and efficient motor assembly.

According to an embodiment, as shown in the exploded perspective view of FIG. 10, motor housing 206 includes a circumferential slot 250 at the end of the motor housing 206 (opposite the fan 208). The slot 250 is arranged on a circumferential surface of the motor housing 260 at or proximate its back plate 260. Slot 250 is arranged so as to radially receive a positional sensor board (herein referred to as hall board) 240 therein from the outside of the housing 206. In an embodiment, slot 250 is arranged close enough to the back plate 260 of the motor housing 206 such that a back surface of the hall board 240 makes contact with an inner surface of the back plate 260 when the hall board 240 is fully inserted.

In an embodiment, as shown in the axial view of FIG. 11, back plate 260 of the motor housing 206 includes a mounting surface for the hall board 240 including retention features 252. Retention features 252 include projections, guides, slots, etc. for retaining the hall board 240 in place when fully inserted. The hall board 240 is received securely between the back plate 260 and the retention features 252.

In an embodiment, as shown in FIG. 11, and with reference to FIGS. 2A and 2B, the hall board 240 includes a hall terminal 242 and three hall sensors 244 arranged to sense the three phases of the rotor. The hall sensors 244 are arranged on the hall board 240 facing the rotor 202 such that they are disposed adjacent the sense magnet ring 306 when the motor 104 is fully assembled. A bottom portion of the hall board 240 includes a curved profile 262 to allow the hall sensor to be arranged radially around a bearing pocket 256 of the motor housing 206. Bearing pocket 256 is arranged to receive a rear bearing 408 of the motor shaft 308 therein. In an embodiment, bearing pocket 256 may also include a through-hole allowing the motor shaft 308 to pass through the motor housing 206 in order for the fan 208 to be coupled to the shaft 308. In an embodiment, the back plate 260 also includes a plurality of air vents 254 arranged around the bearing pocket 256 to allow the air flow generated by the fan 208 to be in fluid communication into the motor housing 206. The air vents 254 are arranged so as to not interfere with the mounting area of the hall board 240.

FIG. 12 depicts a perspective view of an assembled motor 104 including the hall board 240 inserted into the slot 250, according to an embodiment.

In an embodiment, this arrangement offers two advantages. First, the hall board 240 may be assembled into the motor housing 206 after the motor assembly process is substantially complete and the rotor and stator assemblies have been affixed inside the motor housing 206. The hall board may be inserted radially through the slot 250 and secured in engagement with the retention features 252. This substantially eases the assembly process and reduces the risk of damage to the hall board 240. Second, as shown in FIG. 10 and the fully-assembled view of FIG. 12, the hall terminals 242 are arranged substantially close to motor terminals 270 such that the wires routed from the control unit 106 to the motor terminals 270 and the hall terminals 242 can be kept close together. This can be viewed in FIG. 1 (see wires 109). This eliminates the need for the wires to wrap around the motor to an area too far from the control unit 106.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool having a housing and an electric brushless DC (BLDC) motor housed inside the housing, the motor comprising:

a motor housing having a substantially cylindrical body and a back plate, the cylindrical body of the motor housing defining a peripheral slot formed through a circumferential surface of the cylindrical body at or proximate the back plate;

a stator housed within the motor housing;

a rotor pivotably arranged inside the stator, the rotor comprising a rotor shaft, a rotor core rotatably mounted on the rotor shaft and housing a plurality of rotor magnets therein, and a sense magnet ring affixed to the rotor shaft and having a plurality of magnets aligned with the rotor magnets; and a positional sensor board having a plurality of positional sensors mounted thereon, the positional sensor board being radially received through the peripheral slot of the motor housing from outside the motor housing to dispose the positional sensors in close proximity to the sense magnet ring, the peripheral slot having a width sized to radially receive the positional sensor board therethrough.

2. The power tool of claim 1, wherein the motor housing further comprises at least one retention feature configured to securely hold the positional sense board within the motor housing proximate the sense magnet ring.

3. The power tool of claim 2, wherein the positional sensor board is slidingly received between the back plate and the at least one retention feature.

4. The power tool of claim 1, wherein the positional sensors comprise a plurality of Hall sensors mounted on a first surface thereof facing the sense magnet, a second surface of the positional sensor board being in contact with an inner surface of the back plate of the motor housing.

5. The power tool of claim 1, wherein the positional sensor board partially protrudes outside the peripheral slot of the motor housing and comprises a plurality of hall terminals accessible outside the motor housing.

6. The power tool of claim 5, comprising a plurality of motor terminals arranged on the stator and accessible through an opening of the motor housing in substantial proximity to the hall terminals.

7. The power tool of claim 6, further comprising a control unit having a controller and a plurality of power switches controllable via the controller, the control unit being coupled to the motor terminals and the hall terminals via a plurality of wires.

8. The power tool of claim 1, wherein the motor housing further includes a bearing pocket arranged on an inner surface of the back plate, and a lower edge of the positional sensor board includes a curved profile to fit radially around the bearing pocket.

9. The power tool of claim 8, wherein the motor housing further includes a through-hole through the bearing pocket for receiving the rotor shaft, further comprising a fan rotationally affixed to the rotor shaft outside the motor housing.

10. The power tool of claim 9, wherein the motor housing further comprises a plurality of air vents on the back plate to provide fluid communication between the stator and the fan.

11. An electric brushless DC (BLDC) motor comprising:
a motor housing having a substantially cylindrical body and a back plate, the cylindrical body of the motor housing defining a peripheral slot formed through a circumferential surface of the cylindrical body at or proximate the back plate;
a stator housed within the motor housing;
a rotor pivotably arranged inside the stator, the rotor comprising a rotor shaft, a rotor core rotatably mounted on the rotor shaft and housing a plurality of rotor magnets therein, and a sense magnet ring affixed to the rotor shaft and having a plurality of magnets aligned with the rotor magnets; and
a positional sensor board having a plurality of positional sensors mounted thereon, the positional sensor board being radially received through the peripheral slot of the motor housing from outside the motor housing to dispose the positional sensors in close proximity to the sense magnet ring, the peripheral slot having a width sized to radially receive the positional sensor board therethrough.

12. The electric motor of claim 11, wherein the motor housing further comprises at least one retention feature configured to securely hold the positional sense board within the motor housing proximate the sense magnet ring.

13. The electric motor of claim 12, wherein the positional sensor board is slidingly received between the back plate and the at least one retention feature.

14. The electric motor of claim 11, wherein the positional sensors comprise a plurality of Hall sensors mounted on a first surface thereof facing the sense magnet, a second surface of the positional sensor board being in contact with an inner surface of the back plate of the motor housing.

15. The electric motor of claim 11, wherein the positional sensor board partially protrudes outside the peripheral slot of the motor housing and comprises a plurality of hall terminals accessible outside the motor housing.

16. The electric motor of claim 15, comprising a plurality of motor terminals arranged on the stator and accessible through an opening of the motor housing in substantial proximity to the hall terminals.

17. The electric motor of claim 11, wherein the motor housing further includes a bearing pocket arranged on an inner surface of the back plate, and a lower edge of the positional sensor board includes a curved profile to fit radially around the bearing pocket.

* * * * *